United States Patent [19]

Updike

[11] 3,925,017

[45] Dec. 9, 1975

[54] PREPARATION OF DRY, POROUS GEL PARTICLES HAVING HIGH WATER REGAIN FOR LIQUID SAMPLING

[75] Inventor: Stuart J. Updike, Madison, Wis.

[73] Assignee: Wisconsin Alumni Research Foundation, Madison, Wis.

[22] Filed: May 1, 1973

[21] Appl. No.: 356,093

[52] U.S. Cl. ......... 23/230 B; 210/31 C; 260/80.3 N
[51] Int. Cl.² ................. B01D 39/04; G01N 31/06
[58] Field of Search ......... 23/230 B, 259; 424/1, 12; 252/316; 210/31 C, 504; 260/80.3 N

[56] References Cited
UNITED STATES PATENTS

| | | |
|---|---|---|
| 3,105,012 | 9/1963 | Brandon et al. ..................... 424/12 |
| 3,616,936 | 11/1971 | Johansson et al. ................... 210/504 |
| 3,728,290 | 4/1973 | Johansson et al. ......... 260/80.3 N X |
| 3,793,445 | 2/1974 | Updike et al. ....................... 424/12 |
| 3,794,467 | 2/1974 | Adams et al. ..................... 23/230 B |

*Primary Examiner*—Morris O. Wolk
*Assistant Examiner*—Timothy W. Hagan
*Attorney, Agent, or Firm*—McDougall, Hersh & Scott

[57] ABSTRACT

The preparation of dry, porous gel particles having high water regain for use in the removal of reproducible increments of a liquid sample upon rehydration with the sample wherein the dry gel particles are formed by drying from a non-aqueous medium and preferably an alcoholic medium.

5 Claims, No Drawings

PREPARATION OF DRY, POROUS GEL PARTICLES HAVING HIGH WATER REGAIN FOR LIQUID SAMPLING

The invention described herein was made in the course of work under a grant or award from the Department of Health, Education, and Welfare.

This invention relates to dry gel particles having reproducible water regain value, which enables use in sampling a measured amount of liquid coupled with measured amounts of selected components within the liquid sample and to a method for producing the same.

In my copending application Ser. No. 356,092, filed concurrently herewith, and entitled "Device and Method for Sample Application by Water Regain of a Gel," description is made of the utilization of highly hydrophilic, water insoluble, dry gel particles having high water regain value for the removal of an increment of a liquid sample. By reason of the fact that the water regain value is constant, a measured amount of dry gel particles, measured by volume and/or by weight, will remove by water regain a measured amount of the liquid sample, independent of the size of the sample. If the pores are of a size to permit entry of molecular weight components below a certain level while preventing entry of larger molecular weight components, the sample can be fractionated by the dry gel particles from the standpoint of molecular weight. In such instance, the lower molecular weight fraction is capable of entry into the gel pores for retention in the intra gel volume while the remainder stays in the extra gel volume from which it can be washed for removal. In this way, low molecular weight components can be separated from higher molecular weight components making up the sample.

In the sampling of whole blood or blood plasma, the lower molecular weight fraction, capable of entry into the pores for retention of a measured amount of the low molecular weight fraction of the sample, is thus separated from the high molecular weight interfering molecules which are incapable of entry into the pores but instead remain in the extra gel volume from which they can be washed for removal, leaving the measured amount of low molecular weight fraction. Utilization or testing of the retained fraction can be effected in situ in the gel particles or it can be eluted for utilization or testing separate and apart from the gel particles.

Accuracy in the amount of sample removal and retention by the dry gel particles depends upon the constancy of the amount of regain upon rehydration of the dry gel particles with the sample. It has been found, for example, that rehydration of dry gel particles formed by normal lyophilization, such as by freeze drying, vacuum drying, oven drying or the like, causes displacement of air out of the intra gel matrix with the resulting formation of multiple small air bubbles on the surface of the gel particles. The generation of such bubbles is undesirable because they not only introduce a volume of air into the system to replace an amount of water regain, but such small air bubbles also tend to block entry into the pores thereby further to alter the amount of water regain upon rehydration with the sample. This variation is often experienced in the amount of sample taken up upon rehydration of the dry gel particles and thus detracts from the accuracy, as well as the acceptability of the simple and efficient means for removal of a measured amount of fractionated component from a sample.

It has been found, in accordance with the practice of this invention, that this problem of bubble formation on the surfaces of the gel particles upon rehydration can be substantially completely eliminated when the gel particles are dehydrated in a non-aqueous medium, preferably in an organic solvent in which the gel particles are insoluble, and more particularly from a solution of ethanol or other alcohol containing at least 50% by weight alcohol, and preferably at least 90–95% by weight alcohol.

In the presence of ethanol or other alcohol, it is believed that, upon liquid removal, the gel particles collapse into dense gel particles which are substantially devoid of air within the densified gel polymer matrix. As a result, upon rehydration air bubbles are not generated for release into the extra gel space.

The following examples will illustrate the practice of the invention with a polyacrylamide gel:

EXAMPLE 1

Gel preparation:

8 grams of an acrylamide and 1 gram of N,N'methylene-bis-acrylamide are dissolved to a final volume of 36 ml in sodium phosphate buffer solution (0.1 M, ph 7.4). To the resulting solution, 0.1 ml of a suspension of 100 mg of riboflavin in 20 ml of distilled water and 0.02 ml of N,N,N',N'-tetramethyl-ethylenediamine is added, followed by 0.2 mg of sodium hydrosulfite. The admixture, in a suitable vessel, is stoppered and agitated and then is exposed to light from an ordinary tungsten electric light bulb to induce photopolymerization. The polymerization is completed in 5–15 minutes. The reaction vessel is continuously chilled in an ice bath, as needed, to prevent the heat generated by the exothermic polymerization reaction from adversely affecting the binding protein. The gel system is reduced to fine particles, preferably within the range of −40 to +80 mesh.

EXAMPLE 2

Drying gel particles:

The gel particles of Example 1 are allowed to equilibrate and sediment in 0.01 M phosphate buffer at pH 7.4. The supernatent liquid is removed, as by decantation or syphoning, and 10 volumes of 95% ethanol is added.

The gel particles are suspended by mixing in the 95% ethanol and then allowed to settle. The supernatent liquid is again removed, as by decantation or syphoning, and the gel particles are spread as a thin layer on a nylon net or other surface and allowed to dry at room temperature.

The formulation of the gel of which the particles are formed is not significant, since use can be made of any gel forming material which is capable of being reduced into porous, insoluble, highly hydrophilic particles of controlled pore size. As a result, other highly hydrophilic, insoluble gels capable of the desired pore size and drying can be used, but it is preferred to make use of polyacrylamide gels of the type described in the aforementioned application, wherein an acrylamide monomer and cross linking reagent are combined with sufficient of the latter to stabilize the pore size and support the polymer, not only to provide the desired pore size but to give the gel the density desired for rapid sedimentation in particulate form and to provide sufficient rigidity to the gel particles so as to permit use in flowing stream configuration of analysis without plugging. As described in the aforementioned application, the ratio of 1 part by weight cross linking agent to 4–10 parts by weight of monomer, is sufficient to give a gel having a total gel concentration in the range of 12–35%.

The dry gel particles, having predetermined pore size and water regain value, can be used to remove a calibrated increment of sample for testing, independent of the size of the liquid sample passed therethrough. Water regain value of the dry gel particles remains sufficiently constant to enable the removal of aliquot sample portions of equal amounts merely by use of the more accurate and rapid technique of measurement, as by weight or by volume, of the dry gel particles to which the liquid samples are exposed. For example, dry gel particles having a predetermined water regain value, when employed in equal amounts measured by volume or weight, will reproducibly take up precise amounts of liquid containing molecules of minimum size for subsequent test, independent of the size of the sample.

A still further utilization of the dry gel particles prepared in accordance with the practice of this invention resides in a means and method to effect separation of high molecular weight interfering components from low molecular weight components, merely by contacting the liquid sample with the dry gel particles having high water regain value and a pore size sufficient to permit entry of low molecular weight components but insufficient to permit entry of high molecular weight components.

When used for radioimmunoassay, as described in my aforementioned copending application, the antiserum or other protein with the binding sites can be incorporated in suitable dilution in the solution of acrylamide and N,N'-methylene-bis-acrylamide of Example 1, or other gel forming materials whereby the binding protein is retained as active sites within the dried gel particles. It has been found that the antibody protein entrapped within the gel is prevented from undergoing loss of biological activity (denaturing) during ethanolic dehydration since the gel entrapment process appears to prevent the process of hydrophilic aggregation of antibody protein (denaturing) from taking place. Thus, for drying, alcoholic solutions as high as 100% can be used without loss of biological activity and with maximal dehydration of the dry particles.

By the use of a non-aqueous system, such as the described ethanolic solutions, it has also been found possible to combine the antibody binding protein and a tag hormone or other tagged material in the same gel particles, without premature binding of the tag hormone to antibody binding sites. For this purpose, the binding protein is entrapped in the dry gel particles in the intra gel volume, in the manner previously described, while the tag material is incorporated by contacting the dry gel particles with a non-aqueous solution of the tag material which avoids rehydration of the dry gel particles. Thus, in this non-aqueous system, binding of tag material is prevented until rehydration of the gel particles with aqueous sample occurs, at which time tag material can compete with sample material according to the well established principles of competitive binding assay (radioimmunoassay).

EXAMPLE 3

Dry gel particles, with immobilized antibody activity, are contacted with a solution of the tagged hormone in 95% ethanol or other organic alcohol or solvent.

The particles are dried, as in air, or in a chromatographic column, having clean air flowing therethrough, to effect solvent removal.

The resulting dry gel particles now have both antibody binding protein activity and tag hormone in a nonbound form. The tagged hormone does not diffuse into the binding sites until the gel undergoes rehydration with the test sample. At such time the tagged hormone is released to compete with the sample hormone for binding sites.

The water regain value of the gel particles determines how much sample reaches the antibody binding protein contained in the intra gel compartments. The water regain of the gel will depend somewhat on the percent polymer and percent cross linking agent and somewhat upon the thoroughness of the drying process. The dry gel, prepared from alcoholic solution in the manner described, exhibits water regain which will not change under the conditions of temperature and humidity. The particle size as well as the form and shape of the dry gel particles can be varied depending upon the size and shape of the test device.

Analysis of whole blood sample frequently requires separation of serum or plasma from red blood cells and deproteinization before the serum or plasma sample is added to the assay system. This type of sample preparation classically has required centrifugation. The invention described herein provides automatic selection and separation of a precise low molecular weight fraction from both cellular and protein elements of the blood. A variety of lower molecular weight anti-coagulants can be incorporated in the dry gel particles and activated upon contact with whole blood. In this way, clotting of the assay sample is prevented.

The dry gel particles prepared in accordance with this invention find wide use other than in immunoassays. Particular utility can be made thereof in the field of chemical assay as well. Because the gel particles are dry and hydrophilic, the water regain can be employed as a means to measure out a sample without pipetting. The intra gel compartment has a water regain that is reproducible from volume to volume, whether overfilled or underfilled, and the amount of sample removed will always be the same. Because of the entry of the components below a particular molecular weight while holding out higher molecular weight components incapable of entry through the pores, a measured increment of sample, purified from the standpoint of a particular molecular weight fraction, can be removed for testing without the presence of higher molecular weight components, and without the need for centrifuge, pipetting or the like. The components retained in the intra gel volume can be tested in situ or eluted from the gel particles for separate use or testing.

Preparation of the dry gel particles from an ethanolic or other alcoholic or non-aqueous system of the type described permits rehydration by the applied aqueous liquid sample without the formation of bubbles which otherwise introduce error in the accuracy of the test by reason of interferences with the volume of liquid sample which is taken up by the intra gel volume.

It will be understood that changes may be made in the details of formulation and operation without departing from the spirit of the invention, especially as defined in the following claims.

I claim:

1. In the preparation of dry, porous polyacrylamide gel particles having high water regain for use in obtaining reproducible increments of liquid sample upon rehydration with the sample, the improvement comprising mixing the gel in particle form in a volatile, non-aqueous, water miscible, liquid organic solvent medium, removing the gel particles from the non-aqueous medium, and then allowing the gel particles to dry.

2. The method of preparation as claimed in claim 1 in which the non-aqueous medium comprises an alcohol or an alcoholic solution containing at least 50% alcohol.

3. The method of preparation as claimed in claim 1 in which the non-aqueous medium is ethanol.

4. The method of preparation as claimed in claim 1 in which the non-aqueous medium is removed by spreading the gel particles on a drying surface and allowing the gel particles to dry.

5. The method of preparation as claimed in claim 1 in which the gel particles are formed with pores having a size which permits entry of small molecular component into the intra gel volume while preventing entry of larger molecular weight components which remain in the extra gel volume from which they can be flushed, thereby to enable fractionation of the sample while removing a measured increment of the fractionated pores of low molecular weight upon rehyration with the sample.

* * * * *